(12) United States Patent
Shirasu et al.

(10) Patent No.: US 7,329,976 B2
(45) Date of Patent: Feb. 12, 2008

(54) LAMINATED ELECTRONIC COMPONENT

(75) Inventors: Kouji Shirasu, Osaka (JP); Joushi Gotou, Osaka (JP); Hiroyuki Watanabe, Osaka (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/410,646

(22) Filed: Apr. 25, 2006

(65) Prior Publication Data

US 2006/0245141 A1 Nov. 2, 2006

(30) Foreign Application Priority Data

Apr. 27, 2005 (JP) ............................. 2005-129163

(51) Int. Cl.
*H01L 41/07* (2006.01)
(52) U.S. Cl. ........................ 310/366; 310/365
(58) Field of Classification Search ............... 310/365, 310/366
See application file for complete search history.

(56) References Cited

U.S. PATENT DOCUMENTS

2001/0032383 A1* 10/2001 Haratani et al. ........... 29/25.42
2006/0207078 A1* 9/2006 Namerikawa et al. ..... 29/25.35

FOREIGN PATENT DOCUMENTS

| JP | 05-335175 | * | 12/1993 |
|----|-----------|---|---------|
| JP | 09-069463 | * | 3/1997 |
| JP | 09-232179 |   | 9/1997 |
| JP | 10-050548 | * | 2/1998 |
| JP | 2001-185440 | * | 7/2001 |
| JP | 2002-353068 | * | 12/2002 |
| JP | 2004-296709 | * | 10/2004 |

* cited by examiner

*Primary Examiner*—Thomas M. Dougherty
(74) *Attorney, Agent, or Firm*—Hogan & Hartson LLP (57) ABSTRACT

A laminated electronic component is provided which comprises a layered body of generally rectangular shape, including alternately laminated dielectric layers 4 and internal electrode layers 3a and 3b, and external electrodes 5b formed on both ends of the layered body and are connected to the internal electrode layers 3a and 3b. Adjacent internal electrode layers 3a and 3b are exposed alternately on either ends of the layered body. The layered body includes a capacitance generation portion 6 where the adjacent internal electrode layers 3a and 3b are overlapped, and electrode extraction portions 7 where the adjacent internal electrode layers 3a and 3b are not overlapped. The internal electrode 3a and 3b have a first end that is connected to the external electrode 5b and a second end that is not connected to the external electrode 5b. The internal electrode layers 3a and 3b have a thickness that expands gradually in a laminate direction and the opposite direction of the internal electrode layers 3a and 3b so as to extend in a direction from the second end to the first end to straddle at least a border between the capacitance generation portion 6 and the electrode extraction portion 7.

5 Claims, 6 Drawing Sheets

LAMINATED ELECTRONIC COMPONENT

BACKGROUND OF THE INVENTION

Field of the Invention

The present invention relates to laminated electronic components such as a multilayer ceramic capacitor.

Figure 5A:
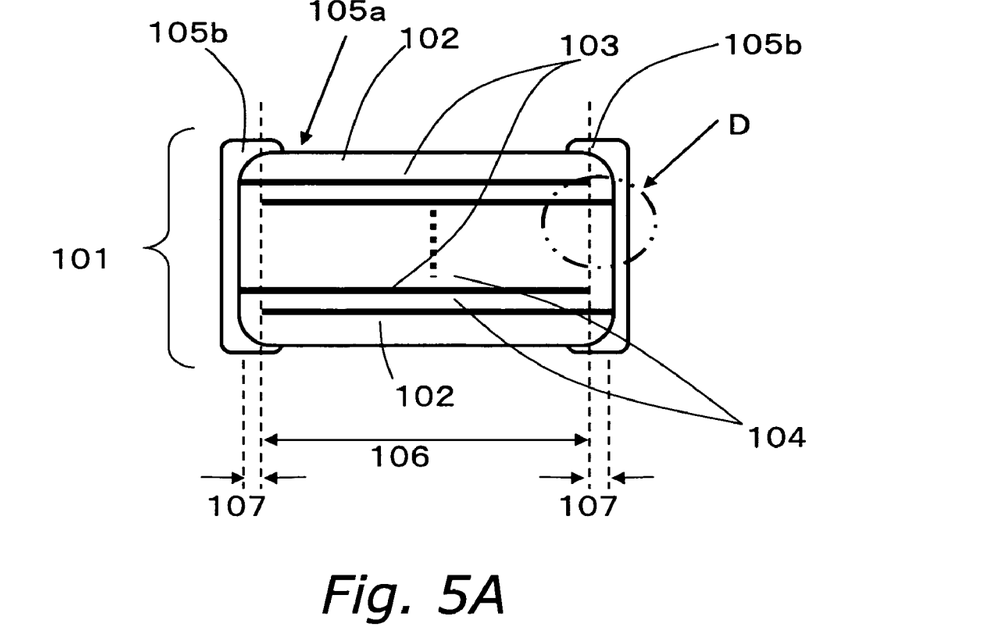
FIG. 5a is a schematic sectional view of a conventional multilayer ceramic capacitor.
Figure 5B:
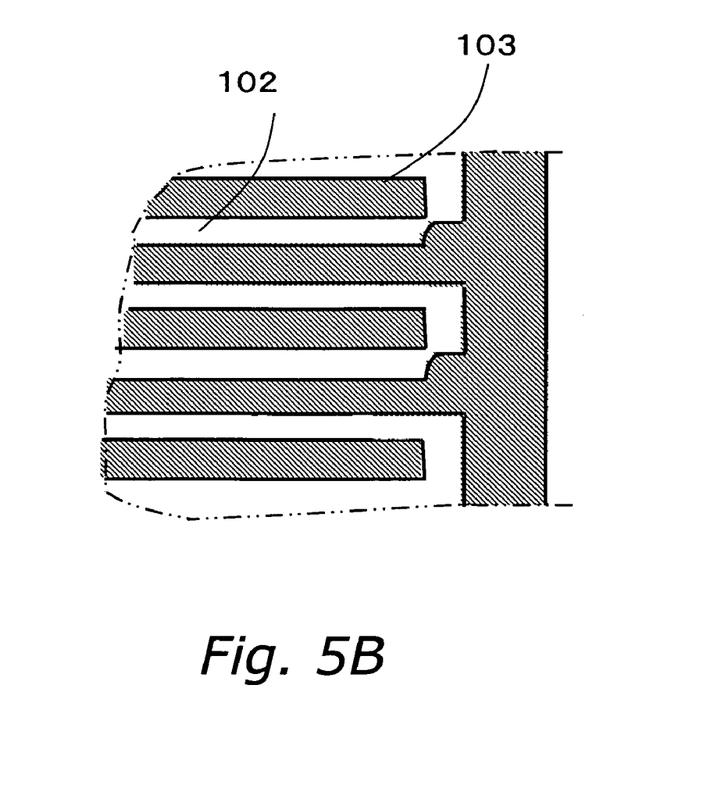

A description will be made on a multilayer ceramic capacitor that represents conventional laminated electronic components. FIG. 5a is a cross-sectional, schematic diagram of a conventional multilayer ceramic capacitor, and FIG. 5b is a fragmentary enlarged view expressed by enlarging D portion in FIG. 5a. The multilayer ceramic capacitor 101 has a layered body 105a, and external electrodes 105b formed on both ends of the layered body 105a. The layered body 105a has a structure composed of a capacitance generation portion 106 and electrode extraction portions 107. The capacitance generation portion 106 indicates a portion composed of alternately layered dielectric layer 104 and internal electrode layers 103, which is covered by insulating layers 102. The electrode extraction portion 107 indicates a portion where the internal electrode layers 103 are connected alternately to either sides of the external electrodes 105b.

Recently, the multilayer ceramic capacitor 101 tends to enlarge an area of the capacitance generation portion 106 by designing the margins (the electrode extraction portions 107) small and to achieve thinning and multilayer stacking of the dielectric layer 104 and the internal electrode layer 103, as it becomes smaller in size and larger in capacitance.

As described above, the thinner the internal electrode layers 103 are, the less junction area between the external electrodes 105b and the internal electrode layers 103. Therefore, there is a problem that faulty electrical continuity occurs partially between the external electrodes 105b and the internal electrode layers 103, thereby not providing the desired capacitance.

In order to solve the problem, as shown in FIG. 5b, a multilayer ceramic capacitor has been proposed in which the internal electrode layers 103 have a partially thicker connections to the external electrode 105b (refer to Unexamined Patent Publication H9-232179, for example).

The multilayer ceramic capacitor in the above-mentioned Patent Document 1 has an improved bonding between the internal electrode layers and the external electrodes. However, if it is used for a long time, insulation deterioration is generated to cause short circuits between the internal electrode layers because a gap between the adjacent internal electrode layers is small. Particularly, the first ends of the internal electrodes are partially thicker to form corners, thereby causing more short circuits between the adjacent internal electrode layers.

It is an object of the present invention to provide a high-reliability laminated electronic component having a reliable connectivity between the internal electrode layers and the external electrodes, and reducing short circuits between the internal electrode layers caused by the insulation deterioration.

SUMMARY OF THE INVENTION

In order to solve the problems, according to a first aspect of the present invention, a laminated electronic component is provided which comprises a layered body of generally rectangular shape, including alternately laminated dielectric layers and internal electrode layers, and external electrodes formed on both ends of the layered body and connected to the internal electrode layers. The adjacent internal electrode layers are exposed alternately on either ends of the layered body. The layered body includes a capacitance generation portion where the adjacent internal electrode layers are overlapped, and electrode extraction portions where the adjacent internal electrode layers are not overlapped. The internal electrode layer has a first end that is connected to the external electrode and a second end that is not connected to the external electrode. The internal electrode layer has a thickness that expands gradually in a laminate direction and the opposite direction of the internal electrode layers so as to extend in a direction from the second end to the first end to straddle at least a border between the capacitance generation portion and the electrode extraction portion.

As described above, since the thickness of the internal electrode layer in the vicinity of the first end as the electrode extraction portion is increased, it is possible to ensure sufficiently junction area between the layered body and the external electrodes to reduce faulty electrical continuity. Furthermore, the thickness of the first ends of the internal electrode layers does not increase suddenly at the border between the capacitance generation portion and the electrode extraction portion toward the external electrode, but increases gradually to straddle the border. Accordingly, in an area where the first end of the internal electrode layer, which is connected to the external electrode, and the second end of the internal electrode layer, which is adjacent with the first end and are not connected to the external electrode, are adjacent with each other, no corner on which voltage tends to concentrate is formed in the first ends. As a result, it is possible to reduce effectively short circuits between the internal electrode layers.

Furthermore, since thickness of the whole of the internal electrode layer is not increased but the thickness increases gradually as it proceeds toward the first end, which is connected with the external electrode, it is possible to design the gap between the internal electrode layers adjacent with each other in a laminate direction in the capacitance generation portion to be wider relatively. As a result, it is possible to reduce effectively short circuits caused by contacts of the internal electrode layers in the capacitance generation portion.

According to a second aspect of the present invention, in the first aspect of the invention, a relational expression $1.1 \leq Ds/(2 \times Dm) \leq 1.3$ is satisfied, wherein Dm represents thickness of the dielectric layer in the capacitance generation portion and Ds represents thickness of the dielectric layer in the electrode extraction portion.

If thickness Dm of the dielectric layer in the capacitance generation portion and thickness Ds of the dielectric layer in the electrode extraction portion are set to satisfy the relational expression $1.1 \leq Ds/(2 \times Dm)$, it is possible to widen the gap between the adjacent internal electrode layers, thereby preventing the short circuits between internal electrode layers more preliminarily. Also, if Dm and Ds are set to satisfy the relational expression $Ds/(2 \times Dm) \leq 1.3$, it is possible to widen a junction area between the internal electrode layers and the external electrodes. As a result, the faulty electrical continuity is prevented so that the reliable laminated electronic components can be provided.

According to a third aspect of the present invention, in the first aspect of the invention, the second end of the internal electrode layer has a shape of convex curve.

In the internal electrode layer, the first end connected to the external electrode has a thickness increasing gradually, and the second end has a shape of convex curve to remove the corners. Since the first end of the internal electrode layer and the second ends of the internal electrode layers adjacent with the first end in vertical directions are formed as mentioned before, gaps between the internal electrode layers become wider especially in the electrode extraction portion, i.e., a joined region between the external electrode and the internal electrode layers, it is possible to prevent dielectric breakdown. Additionally, since the gap between the internal electrode layers is wider, the second ends of the internal electrode layers can be extended further toward the external electrode. Accordingly, it is possible to obtain a higher capacitance because an area of the capacitance generation portion can be set larger.

According to a fourth aspect of the present invention, in the first aspect of the invention, the second end of the internal electrode layer is formed such that the thickness of the second end decreases gradually as it proceeds toward the adjacent external electrode.

In the internal electrode layer, the thickness of the first end connected to the external electrode increases gradually as it proceeds toward the external electrode, and the thickness of the second end decreases gradually as it proceeds toward the external electrode. Accordingly, as in the third aspect of the present invention, gaps between the internal electrode layers become wider especially in the electrode extraction portion to prevent the dielectric breakdown. Also, it is possible to obtain a higher capacitance by extending the second ends of the internal electrode layers further toward the external electrode.

According to a fifth aspect of the present invention, in the first aspect of the invention, the external electrode is made of a plated film that is deposited from the first ends of the internal electrode layers as starting points.

If the external electrode is formed of plated film, the bond strength between the external electrode and the layered body is maintained mainly by bonding between the metal grains of both electrodes at the junction region between the external electrode and the exposed area of the internal electrodes. If the external electrode is formed by plating as in the conventional laminated electronic component (capacitor), the exposed area of the internal electrodes is small so that the delamination tends to occur. In contrast, according to the present invention, since the thickness of the internal electrode layers increases gradually in the laminate direction and the opposite direction, the junction area between the internal electrode layers and the plated film increases. As a result, the bond strength of the external electrode with the capacitor main body is improved to prevent the delamination.

According to the present invention, it is possible to provide a reliable laminated electronic component having a good connectivity between the internal electrode and the external electrode, and reducing short circuits between the internal electrode layers caused by the insulation deterioration.

BRIEF DESCRIPTION OF THE DRAWINGS

Referring now to the attached drawings which form a part of this original disclosure:

FIG. 1b is a fragmentary enlarged view of A portion in FIG. 1a;

FIG. 5b is a fragmentary enlarged view of D portion in FIG. 5a.

DETAILED DESCRIPTION OF THE PREFERRED EMBODIMENTS (1) Overall Structure

Figure 1A:
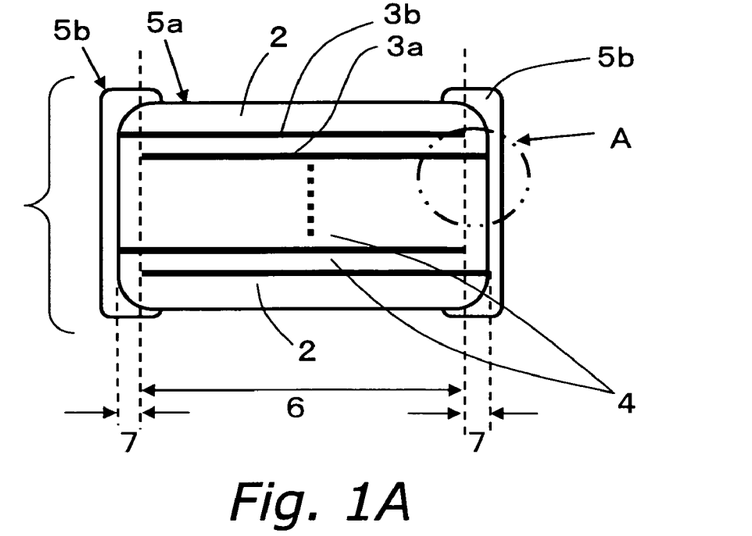
FIG. 1a shows a schematic sectional view of a multilayer ceramic capacitor as one embodiment according to the present invention.

Hereinafter, as one embodiment according to the present invention, a multilayer ceramic capacitor representing laminated electronic components will be described referring to figures. FIG. 1a is a schematic cross-sectional view of a multilayer ceramic capacitor as one embodiment according to the present invention.

As shown in FIG. 1a, a multilayer ceramic capacitor 1 has a layered body 5a and external electrodes 5b deposited on both ends of the layered body 5a. The layered body 5a has a structure composed of a capacitance generation portion 6 and electrode extraction portions 7. In this device, the capacitance generation portion 6 indicates a portion composed of dielectric layers 4 having a certain dielectric constant and internal electrode layers 3a and 3b that are alternately stacked, and insulating layers 2 covering upper and lower principal surfaces of the stacked layers. The dielectric layers 4 and the insulating layers 2 are made of the same material. The electrode extraction portions 7 indicate portions where both ends of the internal electrode layer 3a and 3b are electrically connected to the external electrodes 5b in an alternate manner.

The multilayer ceramic capacitor 1 serves as a capacitor when the predetermined voltage is applied via the external electrodes 5b to portions between the adjacent internal electrode layers 3a and 3b to generate the predetermined capacitance in the dielectric layers 4 disposed between the internal electrode layers 3a and 3b.

The number of the dielectric layer 4 or the internal electrode layers 3a and 3b can be suitably decided, for example, between 30 layers and 600 layers. In addition, the property of material and the thickness of the dielectric layers 4 and facing areas of the internal electrode layers 3a and 3b can be suitably decided according to a desired capacitance.

Figure 1B:
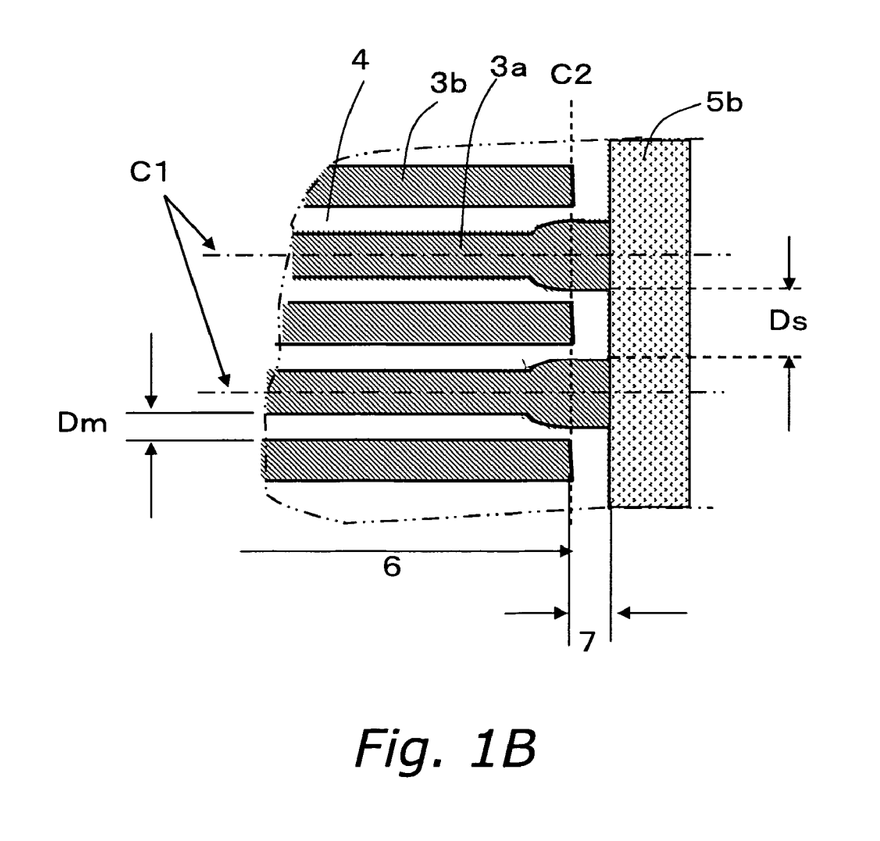

FIG. 1b a fragmentary enlarged view of A portion in FIG. 1a. As shown in FIG. 1b, each of the internal electrode layers 3a has a first end that is connected to the external electrode 5b and a second end that is not connected to the external electrode 5b. The thickness of internal electrode layer 3a increases gradually in both directions of lamination of the internal electrode layer 3a and 3b with reference to line C1 at the center in the thickness direction (referred to as center line C1 in the thickness direction, hereinafter), as it proceeds from the second end to the first end to straddle at least a border between the capacitance generation portion 6 and the electrode extraction portion 7. For example, the thickness in the vicinity of first end expands gradually in the vertical directions that crosses the center line C1, i.e., in the laminate direction. Moreover, the thickness of the internal electrode layer 3a increases gradually as it proceeds toward the external electrode 5b so as to straddle border line C2 between the capacitance generation portion 6 and the electrode extraction portion 7, i.e., a terminal position of the capacitance generation portion 6. It should be noted that the minimum requirements for the internal electrode layer 3a is that the thickness is large at the first end, which is a connection with the external electrode, and the thickness is increased gradually to straddle the border line C2 to the connections. Accordingly, a position where the thickness starts to be increased (start position) is not particularly limited. The internal electrode layer does not need to have a symmetric thickness about the center line C1. In other words, the thickness may be asymmetric if the thickness expands in the laminate direction and in the opposite direction.

As mentioned above, the internal electrode layer 3a has a thick portion in the vicinity of the first end in the electrode extraction portion 7 so that the junction area between the layered body and the external electrode 5b can be sufficiently ensured to reduce the faulty electrical continuity. Additionally, the thickness of the first end of the internal electrode layer 3a increases gradually to straddle the border between the capacitance generation portion 6 and the electrode extraction portion 7, not increasing suddenly at the border between the capacitance generation portion 6 and the electrode extraction portion 7 toward the external electrode 5b so that the first end of the internal electrode layer 3a is not formed with a corner on which the voltage tend to concentrate, in an area where the first end of the internal electrode layer 3a, which is connected to the external electrode 5b, and the second end of the internal electrode layers 3b adjacent with the internal electrode layer 3a in a vertical direction, which is not connected to the external electrode 5b, are very close to each other. As a result, the short circuits between the internal electrode layers can be reduced effectively. Additionally, as described above, the thickness of the internal electrode layer 3a is increased only in the vicinity of the first end, which is connected to the external electrode 5b, not increasing the thickness of the whole of the internal electrode layers 3a and 3b so that relatively wider gaps can be designed between the internal electrode layer 3a and 3b that are adjacent with each other in the laminate direction in the capacitance generation portion 6. As a result, in the capacitance generation portion 6, it is possible to reduce effectively the short circuits caused by the internal electrode layers 3a and 3b.

(2) Thickness of the Dielectric Layer

The dielectric layer 4 has a shape that satisfies a relational expression $1.1 \leq Ds/(2 \times Dm) \leq 1.3$, wherein the thickness of the dielectric layer in the capacitance generation portion 6 is expressed as Dm and the thickness of the dielectric layer in the electrode extraction portion 7 is expressed as Ds. Accordingly, the gap between the adjacent internal electrode layers is wider to prevent preliminarily short circuits between the internal electrode layers, and the junction area between the internal electrode layers 3a and the external electrode 5b is wider to prevent the faulty electrical continuity. It should be noted that if the thickness of the internal electrode layers 3a and 3b are compatible with that of the internal electrode layers of a typical capacitor, e.g., 0.5 μm to 5.0 μm, the relational expression is effective.

(3) Various Shapes of the Internal Electrode Layers

Figure 1C:
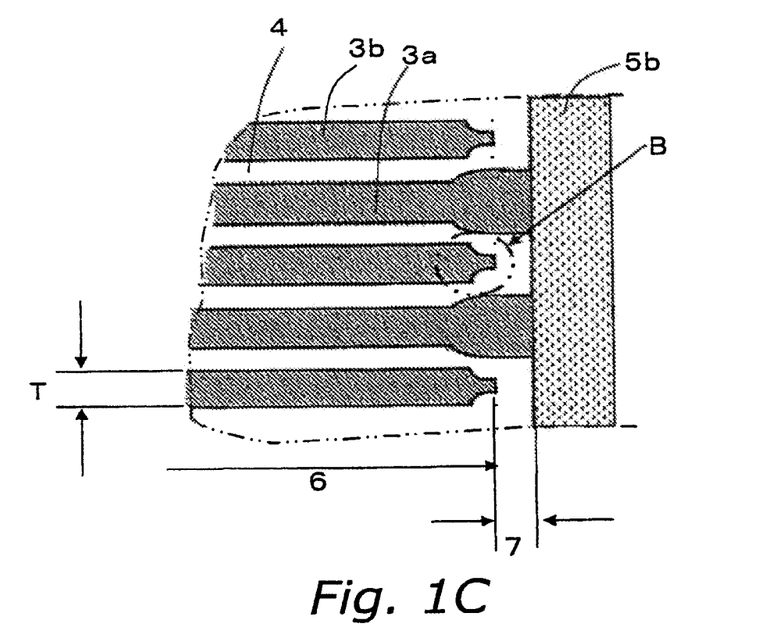
FIG. 1c is a first sectional view of various forms of the internal electrode layers 3a and 3b in joined regions.
Figure 1D:
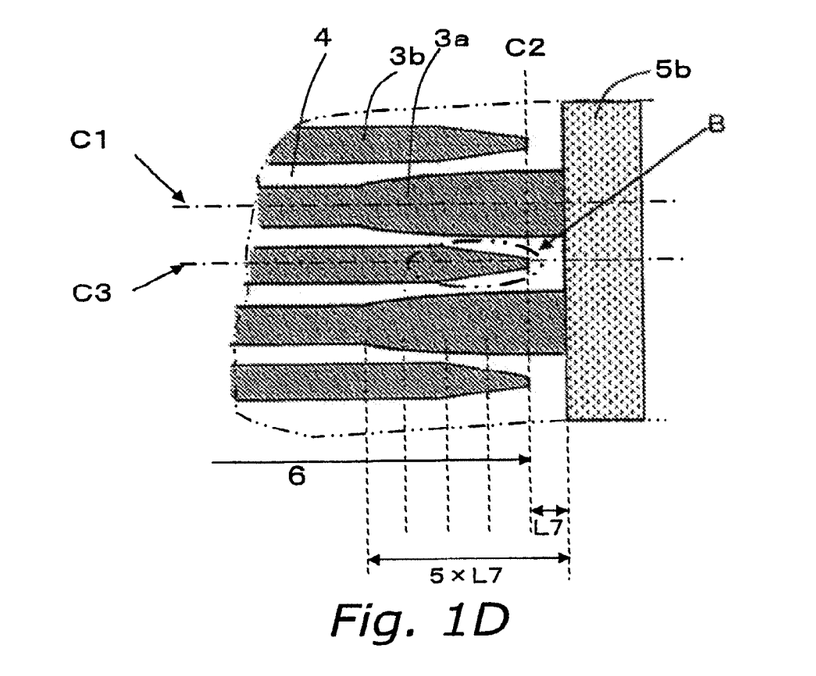
FIG. 1d is a second sectional view of various forms of the internal electrode layers 3a and 3b in a joined region.

FIG. 1c and FIG. 1d are sectional views showing various shapes of the portions of the internal electrode layers 3a and 3b at the joined region.

As shown in FIG. 1c, in the vicinity of the first end of the internal electrode layer 3a, which is connected to the external electrode 5b, the thickness of the internal electrode layer 3a is increased gradually. Meanwhile, in the internal electrode layer 3b adjacent with the internal electrode layer 3a, the second ends (B portion in the figure), which are not connected to the external electrode 5b, have a shape of convex curve. Since the second end shown as B portion has a shape of convex curve, gaps between the adjacent internal electrode layers are widened further, thereby preliminarily preventing the dielectric breakdown. It is preferable that curvature radius R of the convex curve satisfies $(T \times 1/2) \geq R \geq (T \times 1/20)$, wherein thickness of the internal electrode layer 3b in the capacitance generation portion 6 is expressed as T. Accordingly, for example, when the multilayer ceramic capacitor 1 is mounted on the circuit board, the stress put on the multilayer ceramic capacitor 1 is reduced significantly so that generation of cracks can be reduced.

Alternatively, as shown in FIG. 1d, the second ends (B portion in the figure), which are not connected to the external electrode 5b, may be thinned gradually as it proceeds toward the external electrode 5b. More preferably, the thickness is reduced gradually from both sides with reference to center line C3 in the thickness direction of the internal electrode layers. Since the second end shown as B is reduced gradually in thickness, gaps between the adjacent internal electrode layer 3a and 3b can be widened. Since, as described above, particularly, the thickness of the internal electrode layer 3b in the vicinity of the second end is decreased gradually, while the thickness of the internal electrode layer 3a in the vicinity of the first end is increased gradually, intervals between the internal electrode layers in the adjacent regions are sufficiently ensured, thereby to reduce the short circuits. Additionally, since the gaps between the adjacent internal electrode layers in the adjacent region can be broadened, the second end of the internal electrode layer 3b can be extended toward the external electrode 5b. As a result, an area of the capacitance generation portion 6 can be enlarged to achieve a higher capacitance.

Alternatively, the thickness of the internal electrode layers 3a and 3b may be increased gradually from the second end, which is not connected to the external electrode 5b, to connections with the external electrode 5b, i.e., over the entire area of the internal electrode layers 3a and 3b. Preferably, the thickness of the internal electrode layers 3a and 3b are gradually increased from the centers of the internal electrode layers 3a and 3b to the first end, which is connected with the external electrode 5b, in order to compensate for capacitance variances caused by different thickness (distances between the internal electrode layers) of the dielectric layers 4. More preferably, in view of the above, the internal electrode layer 3 expands gradually in both the laminate directions, as shown in FIG. 1d, from a point of a length less than or equal to five times as long as length L7 of the electrode extraction portion 7 (5×L7) from the external electrode 5b, to the external electrode 5b.

The start position from which the thickness of the internal electrode layers 3a and 3b starts to be increased gradually can be controlled by adjusting how close hardness of the internal electrode layers and hardness of the dielectric layers are. For example, in order to set the start position to the point whose length is more than or equal to 5×L7 from the first end as described before, the contents of the dielectric slurry to make the dielectric layers such as an organic binder, a plasticize, a solvent and so on are adjusted such that polyvinyl butyral as an organic binder is 9 to 13 parts by weight, di-isononyl phthalate as a plasticize is 1 to 3 parts by weight, and ethanol as a solvent is 120 parts by weight, per 100 parts by weight of the ceramic dielectric powder. In addition, the contents of the conductive paste to form the internal electrode layers such as an organic binder, a plasticize, a solvent and so on are adjusted such that polyvinyl butyral as an organic binder is 4.5 to 7.5 parts by weight, di-isononyl phthalate as a plasticize is 0.5 to 3 parts by weight, and octylic acid as a solvent is 90 parts by weight, per 100 parts by weight of the metallic nickel powder.

The components of the internal electrode layers 3a and 3b can be combined suitably.

(4) Materials

The dielectric layer 4 is manufactured by coating the dielectric ceramic slurry by doctor blade method, for example, and firing it. The dielectric ceramic slurry is a mixture of a dielectric ceramic material, an organic binder, an organic solvent, a dispersant and a plasticize.

The dielectric ceramic material is not specifically limited and can be any materials that are used for a typical multi-layer ceramic capacitor, such as a temperature compensating material and a high dielectric constant material. For example, barium titanate series material can be used.

The organic binder used for the dielectric ceramic slurry is not specifically limited, and can be chosen from various ordinary organic binders that are typically used, such as polyvinyl butyral, ethyl cellulose, acrylic polymer, vinyl chloride polymer, ester polymer, imide polymer, and urethane polymer.

The organic solvent used for the dielectric ceramic slurry is not specifically limited either, and can be chosen from ketone solvent such as acetone, methyl ethyl ketone (MEK), methyl isobutyl ketone (MIBK), and cyclohexanone; esters solvent such as methyl acetate, ethyl acetate, and butyl acetate; alcohols solvent such as methanol, ethanol, isopropanol, and α-terpineol; hydrocarbons solvent such as hexane, benzene, toluene, xylene; ether solvent such as glycol dimethyl ether, glycol monoethyl ether, dioxane, and tetrahydrofuran; and carboxylic acid solvent such as acetic acid, propionic acid, hexane acid, isonanoic acid, and octylic acid. These solvents can be mixed for use.

The internal electrode layers 3a and 3b are formed by applying conductive paste by screen printing or coating, and firing the paste. The conductive paste is made of a mixture of an electrical conducting material, an organic binder, an organic solvent, a dispersant and a plasticize.

The electrical conducting material can be chosen from the above-mentioned electrode materials suitable as the dielectric ceramic material. The electrical conducting material can be, for example, conductive materials of various conducting metals such as nickel, silver, platinum, palladium, gold, copper or alloys thereof, and so on, or various oxides and organometallic compounds that become the above-mentioned conductive material after the firing. For, example, the electrical conducting material can be one or more noble metal selected from a group of Pb, Pt, Ag, and Au or alloys thereof, or base metals such as Ni and Cu.

The organic binder for the conductive paste is not limited specifically, and can be chosen from various ordinary organic binders such as polyvinyl butyral, ethyl cellulose, acrylic polymer, vinyl chloride polymer, ester polymer, imide polymer, and urethane polymer.

The organic solvent for the conductive paste is not specifically limited either, and can be chosen from ketone solvent such as acetone, methyl ethyl ketone (MEK), methyl isobutyl ketone (MIBK), and cyclohexanone; esters solvent such as methyl acetate, ethyl acetate, and butyl acetate; alcohols solvent such as methanol, ethanol, isopropanol, and α-terpineol; hydrocarbons solvent such as-hexane, benzene, toluene, xylene; ether solvent such as glycol dimethyl ether, glycol monoethyl ether, dioxane, and tetrahydrofuran; and carboxylic acid solvent such as acetic acid, propionic acid, hexane acid, isonanoic acid, and octylic acid. These solvents can be mixed for use.

(5) Method for Manufacturing

The above-mentioned method for manufacturing a multi-layer ceramic capacitor will be described hereinafter, referring to FIG. 2 and FIG. 3.

Figure 2A:
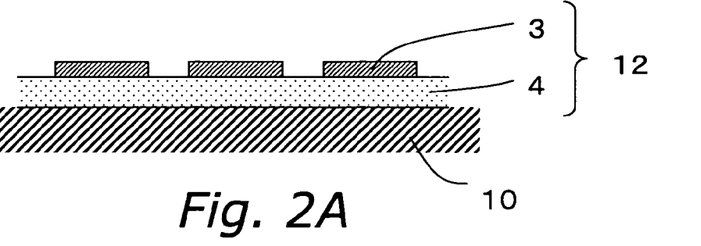
FIG. 2a is a view of a process of forming a composite sheet composed of a dielectric layer and an internal electrode layer printed thereon.
Figure 2B:
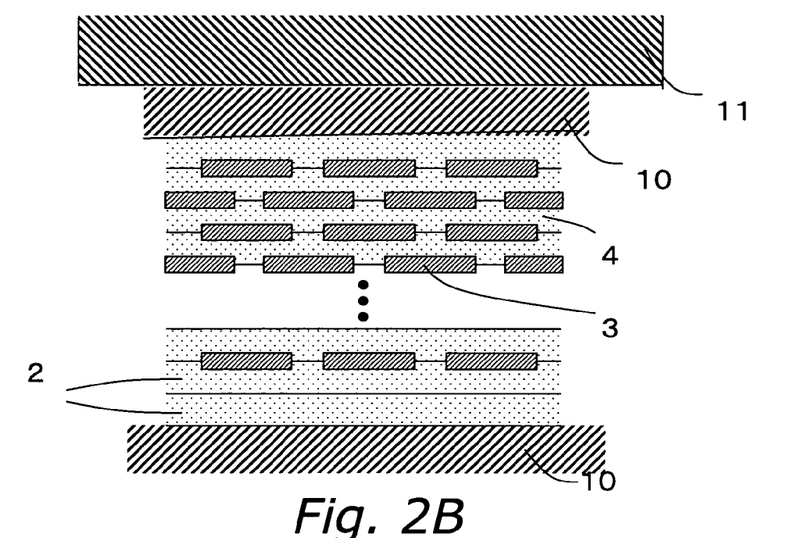
FIG. 2b is a view of a process of laminating composite sheets composed of a dielectric layer and an internal electrode layer printed thereon.
Figure 2C:
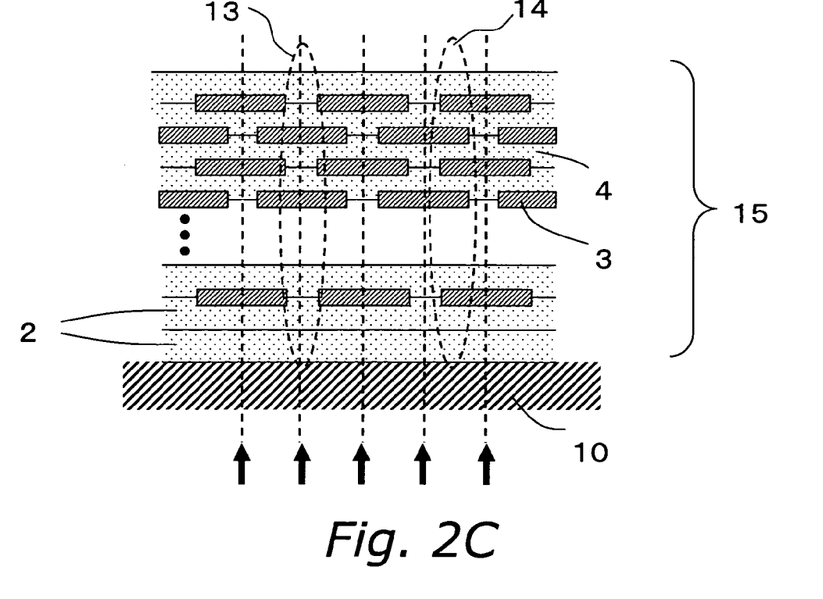
FIG. 2c is a view of a layered body.

FIGS. 2a to 2c are sectional views to explain about a manufacturing processes of a laminated electronic component as one embodiment according to the present invention, and includes FIG. 2a for illustrating a step of forming a composite sheet, FIG. 2b for illustrating a step of laminating the composite sheets, and FIG. 2c for illustrating a layered body. FIG. 3 is sectional view for illustrating a step of pressing the layered body as one embodiment according to the present invention.

Step 1

Initially, as shown in FIG. 2a, the above-mentioned dielectric slurry is applied onto a support member 10 by doctor blade method, for example, and is dried in order to form the dielectric layer 4. Next, the above-mentioned conductive paste is applied onto the dielectric layer 4 by screen printing or coating and is dried in order to form the internal electrode layers 3a and 3b, thereby forming a composite sheet 12. It is noted that the internal electrode layers 3a and 3b can be formed by other methods such as sputtering and plating including an electroless plating, a chemical plating and a hot dipping.

It is noted that contents of the organic binder, the dispersant and the plasticize are adjusted in order to make the hardness of the internal electrode layers 3a and 3b almost the same with the hardness of the dielectric layer 4.

Materials of the support member 10 may be, for example, polyesters such as polyethylene terephthalate, polyethylene-2,6-naphthalate; polyolefines such as polypropylene; and plastic such as cellulose derivative, polyamide, and polycarbonate. The polyethylene terephthalate is preferable because it has excellent tensile strength and heat-resisting property.

Step 2

Next, as shown in FIG. 2b, the composite sheet 12 formed on the support member 10 are laminated on an insulating layer 2 that is made of the same components of the dielectric layer 4 with a suction plate 11, and then the only the support member 10 is peeled. The steps are performed repeatedly to form a plurality of laminated composite sheets 12. As a result, as shown in FIG. 2c, a layered body 15 is formed, which has low-density portions 13 corresponding to areas where the internal electrode layers 3a and 3b are not overlapped in the laminate direction, and high-density portions 14 corresponding to other areas, i.e., areas where the internal electrode layers 3a and 3b are overlapped in the laminate direction.

Step 3

Figure 3:
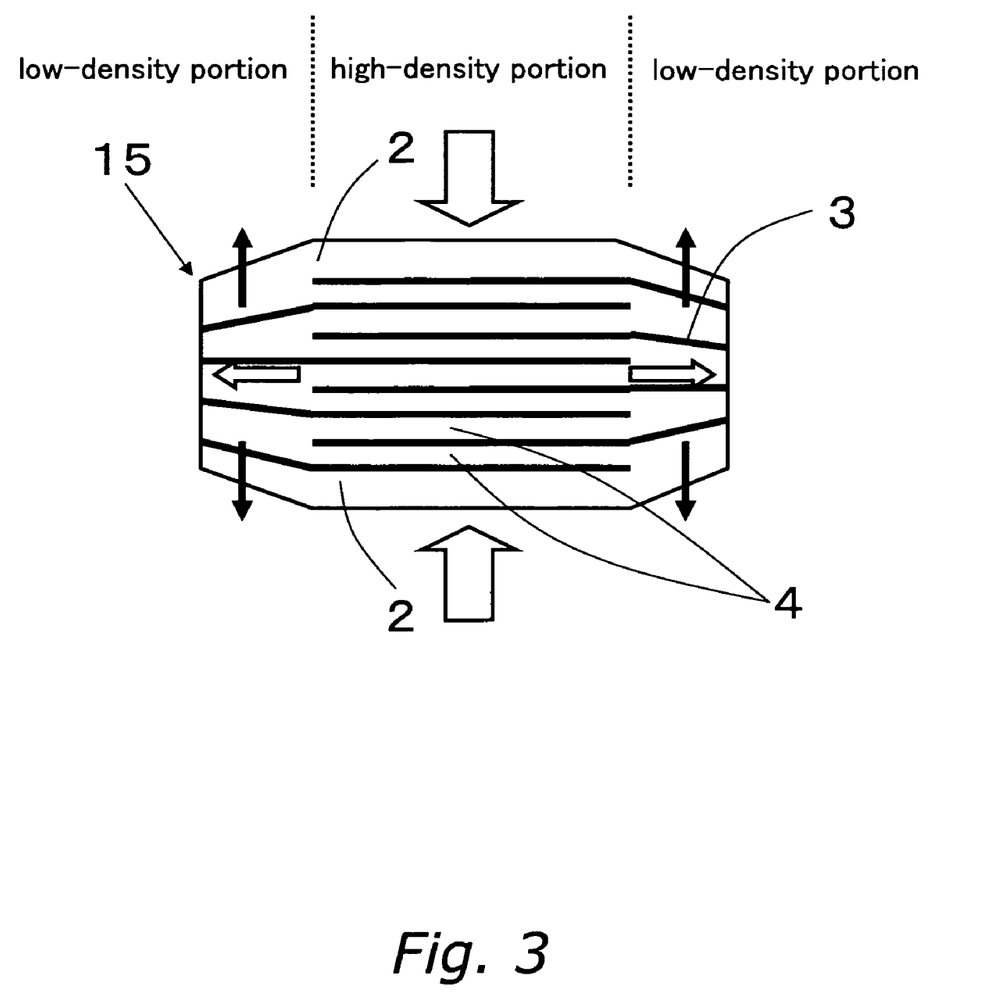
FIG. 3 is a sectional view of a process of pressing a layered body as one embodiment according to the present invention.

FIG. 3 is an enlarged view to show a process of pressing the layered body 15. In FIG. 3, only a part of the pressing is illustrated. As shown in FIG. 3, the layered body 15 is pressed in the laminate direction to move parts of the conductor pattern layer 3 and the dielectric layer 4 from the high-density portion 14 to the low-density portion 13 so that the bonded layered body 15' is formed.

Figure 4A:
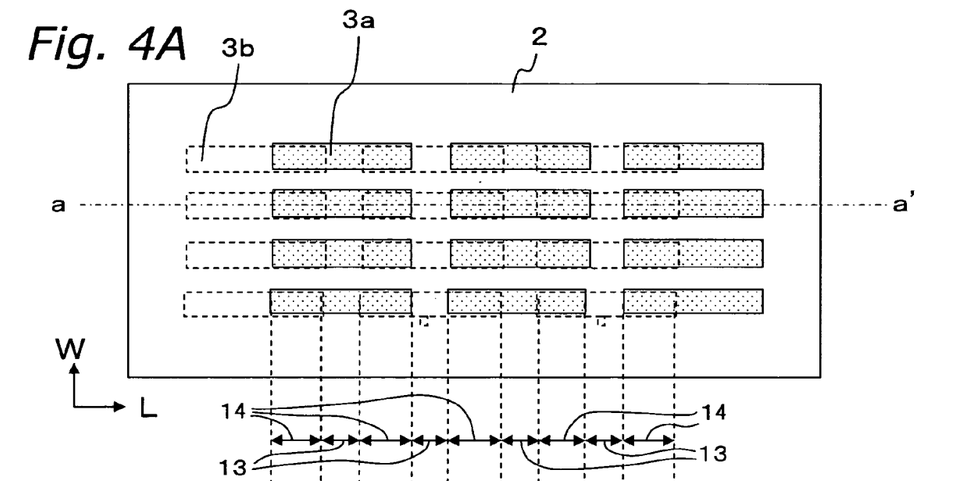
FIG. 4a is a plain view of a bonded layered body 15'.
Figure 4B:
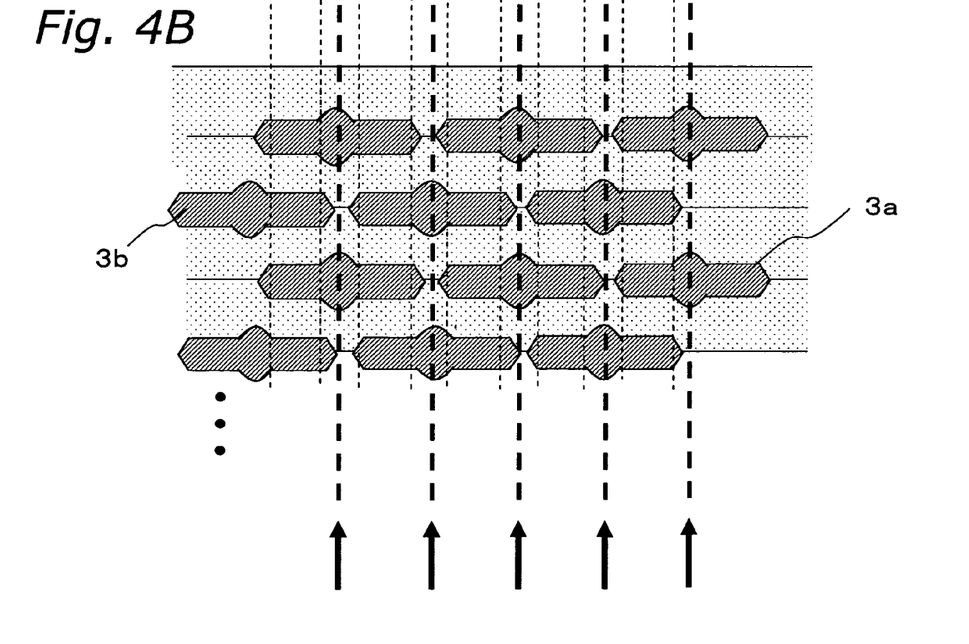
FIG. 4b is a sectional view cut in a-a' in FIG. 4a to illustrate deformation of thickness of an internal electrode layer.

Deformation of the internal electrode layers 3a and 3b after the pressing will be described specifically referring to FIGS. 4a and 4b. FIG. 4a is a plain view of the bonded layered body 15', and FIG. 4b is a sectional view taken on a-a' in FIG. 4a to illustrate a deformation in thickness of the internal electrode layers. As shown in FIG. 3, when the layered body 15 (or the composite sheets 12) is pressed, the internal electrode layers 3a and 3b as well as the dielectric layers 4 are moved and deformed such that the material is pushed out from the high-density portion 14 to the low-density portion 13 because the former experiences a higher pressure force than the latter. As a result, as shown in FIG. 4b, thickness in the middle of the internal electrode layers 3a and 3b, which corresponds to the low-density portion 13 between the high-density portions 14, is deformed so as to increase gradually. The middle potions, which are formed relatively thick, become the first ends of the internal electrode layers 3a and 3b. The thickness of the ends of the internal electrode layers, which corresponds to the low-density portion 13 between the high-density portions 14 is deformed so as to decrease gradually. The end portions, which are formed relatively thin, become the second ends of the internal electrode layers 3a and 3b. In this state, the steps due to the thickness of the internal electrode layers 3a and 3b are alleviated so that the whole of the layered body 15 can be pressure bonded evenly. Moreover, in the bonded layered body 15' manufactured in the above-mentioned way, delamination is effectively suppressed before and after the firing.

The bonded layered body 15' manufactured in the above-mentioned way is divided into separate chip-type multilayered ceramic bodies and each of the bodies is fired at 1340 degrees Celsius. The bonded layered body 15' are cut at cutting positions indicated by arrows in FIG. 4b so that the first ends of the internal electrode layers, whose thickness increase gradually, are exposed. On the other hand, the second ends of the internal electrode layers, whose thickness decrease gradually, are not exposed.

After that, the external electrodes 5b for electrical connection to supply electricity are formed on the ends of the internal electrode layers whose thickness increases gradually, thereby forming the multilayer ceramic capacitor 1 as shown in FIG. 1. In this state, the internal electrode layers whose thickness increase gradually are exposed at both ends of the ceramic body, so it is preferable that the external electrodes are formed of the plated film from the exposed first ends as starting points. For example, when the external electrode are formed of the electroless plating film, the obtained ceramic body is immersed into a Cu electroless plating solution for a predetermined time, Cu electroless plating film is deposited on both ends of the ceramic body from the exposed areas of the internal electrodes as the starting point, then Ni plating film is deposited on the outer surface of the electroless plating film, and finally Sn plating film is deposited on the outer surface of the Ni plating film. It is noted that plating includes electroplating and hot dipping other than the electroless plating. The external electrodes are formed of the plated film as described so that the bond strength between the external electrodes and the layered body is mainly maintained by bonding between metal grains of both electrodes at the joint area of exposed area of the internal electrodes and the external electrode. In the conventional laminated electronic components (capacitor), if the external electrode is formed by plating, the delamination readily occurs because of the small exposed area of the internal electrode layers. In contrast, according to the present invention, since the thickness of the internal electrode layers expands gradually in the laminate direction and the opposite direction, the junction area between the internal electrode layers and the plated film increases so that the bond strength between the external electrodes and the capacitor main body is increased, thereby preventing the delamination.

The manufacturing method for the external electrodes is not limited to one in which the plated film is formed from the exposed area of the internal electrodes as the starting point as described. The external electrode may be formed as follows: a conductive paste is coated at both ends of the ceramic body where the internal electrodes are exposed and fired to form primary electrodes, and an electroless plating film made of Ni or Cu is deposited on the primary electrodes.

EXAMPLE

First, the dielectric layer 4 was formed by molding a dielectric slurry and firing it. The dielectric slurry was a mixture of 9 to 13 parts by weight of polyvinyl butyral (PVB) as an organic binder, 1 to 3 parts by weight of di-isononyl phthalate (DINP) as a plasticize, and 120 parts by weight of ethanol as a solvent, per 100 parts by weight of the ceramic dielectric powder. The dielectric slurry had a thickness of 1.6 µm after the firing.

Next, a conductive paste was printed on the dielectric layer 4 by screen printing, for example, to form the internal electrode layers 3a and 3b. The conducting paste was a mixture of 4.5 to 7.5 parts by weight of PVB as an organic binder, 0.5 to 3 parts by weight of DINP as a plasticize, 90 parts by weight of octylic acid as a solvent, per 100 parts by weight of metallic nickel powder. The internal electrode layers 3a and 3b had a thickness 0.9 µm after the firing. In addition, the hardness of the internal electrode layers 3a and 3b was adjusted to be almost the same as that of the dielectric layer 4.

Two hundred forty three composite sheets 12, which were composed of the laminated dielectric layers 4 and the internal electrode layers 3a and 3b, were sequentially laminated on the insulating layer 2 as the outermost layer, and were pressed under a pressure of 3.92 MPa, and finally the insulating layer 2 as the outermost layer was laminated so that the layered body 15 was formed. Then, the whole of the layered body 15 was pressed under a pressure of 98 MPa to form the bonded layered body 15'.

The bonded layered body 15' manufactured as mentioned above was divided into separate chip-type multilayered ceramic bodies and the bodies were fired at 1340 degrees Celsius. After that, the external electrodes were formed at both ends of the internal electrode for electrical connection to supply electricity. Consequently, the multilayer ceramic capacitor 1 having a size of 1.6 mm×0.8 mm and an effective area as the electrode of 1.4 mm×0.6 mm. When the multilayer ceramic capacitor was cut in the cross-section direction in FIG. 1 and was observed with a scanning electron microscope (SEM), the thickness of the internal electrode layers expanded gradually in the opposite directions with reference to the center line Cl in the laminate direction, extending from the capacitance generation portion to the electrode extraction portion by straddling the border therebetween.

In the multilayer ceramic capacitor manufactured as an outcome of the experiment, the thickness of the internal electrode layer was 1.25 µm and the thickness of the dielectric layer was 2.09 µm in the capacitance generation portion 6. In contrast, the thickness of the internal electrode layer was 1.54 µm and the thickness of the dielectric layer was 3.00 µm in the electrode extraction portion 7. Before the pressing and bonding, the thickness of the internal electrode layer was 1.30 μm, and the thickness of the dielectric layers was 2.20 μm.

COMPARATIVE EXAMPLE

Meanwhile, the conventional capacitor was manufactured by the following method for manufacturing. The conductive paste was the above-mentioned one adjusted to be harder than the dielectric layer. The conductive paste was printed on the internal electrode layer by screen printing and was dried. Then, the screen printing was performed again to make the electrode extraction portion thicker after the internal electrode layers ware printed by screen printing and were dried, thereby forming a capacitor having a conventional construction. Other processes were the same with those of the above-mentioned one. When the capacitor was cut for cross-sectional observation, thickness of the internal electrode layer in the electrode extraction portions was thicker in one laminate direction than that of the internal electrode layer at the capacitance generation portion. In other words, thickness of the internal electrode layer in the electrode extraction portions did not have a shape of expanding the thickness from the center line C1 of the internal electrode layer, unlike the present invention.

Next, reliability tests such as temperature and humidity tests were performed on the manufactured capacitors, and then the capacitance was measured with an LCR meter at a frequency of 1.0 kHz at room temperature. The capacitor having more than or equal to a capacitance of 4.7 μF were identified as conforming items.

After the reliability test was performed, it was known by the observation of the cross-section of the capacitors that samples of the conventional capacitors had a number of short circuits between the internal electrode layers caused by the insulation deterioration. Furthermore, there were poor connections between the internal electrode layers and the external electrodes so that the desired capacitance value was not obtained. In contrast, in the capacitors according to the present invention, since the gaps between the internal electrode layers were wider, short circuit failures caused by the insulation deterioration decreases compared to the conventional capacitors, and since the connectivity between the internal electrode layers and the external electrodes were good, the desired capacitance value was obtained.

Furthermore, the cross section of the capacitor according to the present invention was observed in detail to measure thickness Dm of the dielectric layer in the capacitance generation portion and thickness Ds of the dielectric layer in the electrode extraction portions. The results are shown in Table 1. In the capacitors having Ds/(2×Dm) smaller than 1.1, short circuit failure occurred due to the insulation deterioration. In the capacitors having Ds/(2×Dm) smaller than 1.1, since the gap between the adjacent internal electrode layers is smaller, the dielectric layers existing in minute gaps between the internal electrode layers deteriorate, thereby causing the internal electrode layer to be in contact with each other for short circuits. In contrast, in the capacitors having Ds/(2×Dm) more than 1.3, the desired capacitance was not obtained. This is attributable to the fact that since the thickness of the dielectric layers is large, thickness of connections between the internal electrode layers and the external electrodes is decreased, thereby causing the faulty electrical continuity.

The capacitors that satisfied a relational expression of $1.1 \leq Ds/(2 \times Dm) \leq 1.3$ had no short circuit failures caused by the insulation deterioration and provided the desired capacitance value.

The present invention can be applicable, not only to a multilayer ceramic capacitor, but also to multilayer ceramic components such as a coil, an inductor, and a circuit board.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A laminated electronic component comprising:
a layered body of generally rectangular shape, having dielectric layers and internal electrode layers alternately laminated, where internal electrode layers are exposed alternately on either ends of the layered body; and
external electrodes formed on both ends of the layered body and connected to the internal electrode layers; wherein
the layered body includes a capacitance generation portion where the adjacent internal electrode layers are overlapped, and electrode extraction portions where the adjacent internal electrode layers are not overlapped,
the internal electrode layers has a first end that is connected to the external electrode and a second end that is not connected to the external electrode,
the internal electrode layer has a thickness that expands, from a point of a length less than or equal to five times as long as the length of the electrode extraction portion, gradually both in a laminate direction of the internal electrode layers and the opposite direction so as to extend in a direction from the second end to the first end to straddle a border between the capacitance generation portion and the electrode extraction portion, and
the second end of the internal electrode layer is formed such that its thickness gradually becomes thinner towards the external electrode.

2. The laminated electronic component according to claim 1, wherein a relational expression $1.1 \leq Ds/(2 \times Dm) \leq 1.3$ is satisfied, wherein Dm represents thickness of the dielectric layer in the capacitance generation portion and Ds represents thickness of the dielectric layer in the electrode extraction portion.

3. The laminated electronic component according to claim 1, wherein the second end of the internal electrode layer has a shape of convex curve.

4. The laminated electronic component according to claim 1, wherein the second end of the internal electrode layer is formed such that the thickness of the second end decreases gradually as it proceeds toward the adjacent external electrode.

5. The laminated electronic component according to claim 1, wherein the external electrode is made of a plated film that is deposited from the first ends of the internal electrode layers as starting points.

* * * * *